United States Patent
Chen

(10) Patent No.: US 9,574,763 B2
(45) Date of Patent: Feb. 21, 2017

(54) MULTIFUNCTIONAL HOME MONITORING SYSTEM COMBINED WITH LIGHTING DEVICE

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

(21) Appl. No.: 15/011,646

(22) Filed: Jan. 31, 2016

(65) Prior Publication Data
US 2016/0150135 A1    May 26, 2016

Related U.S. Application Data

(63) Continuation-in-part of application No. 14/258,029, filed on Apr. 22, 2014.

(30) Foreign Application Priority Data

Mar. 12, 2014  (CN) .......................... 2014 1 0089724
Dec. 18, 2015  (CN) .......................... 2015 1 0943772

(51) Int. Cl.
| | |
|---|---|
| *F21V 33/00* | (2006.01) |
| *H05B 33/08* | (2006.01) |
| *F21K 9/20* | (2016.01) |
| *H04N 5/225* | (2006.01) |
| *H04N 7/18* | (2006.01) |
| *G08B 13/196* | (2006.01) |

(52) U.S. Cl.
CPC ............. *F21V 33/0076* (2013.01); *F21K 9/20* (2016.08); *F21V 33/0052* (2013.01); *H04N 5/2252* (2013.01); *H04N 7/183* (2013.01); *H05B 33/0857* (2013.01); *G08B 13/19619* (2013.01); *H04N 5/2256* (2013.01)

(58) Field of Classification Search
None
See application file for complete search history.

(56) References Cited

U.S. PATENT DOCUMENTS 4,896,145 A * 1/1990 Lewkowicz ........ F21V 33/0076
307/66
6,812,970 B1 * 11/2004 McBride .......... G08B 13/19619
348/151

(Continued)

FOREIGN PATENT DOCUMENTS

JP             201222579 A    2/2012

*Primary Examiner* — David N Werner
(74) *Attorney, Agent, or Firm* — Leong C. Lei

(57) ABSTRACT

Disclosed is a multifunctional home monitoring system combined with a lighting device, which includes a main housing that includes a main control board. The main housing is provided therein with a detection module for detecting the environment, a control module for connection with household electric appliances, a status indicator assembly for reminding purposes, a speaker and microphone for receiving and recognition, and an LED light assembly for illumination purpose, which are electrically connected to the main control board. A lower housing is mounted to a lower side of the main housing. The lower housing includes a secondary illumination light arranged therein and being further provided with an image capture module for image recording. The image capture module is coupled to a body detection module, a biological recognition module, and a motor arranged in the main housing to be driven by the motor.

6 Claims, 15 Drawing Sheets

(56) References Cited

U.S. PATENT DOCUMENTS

| | | | | |
|---|---|---|---|---|
| 6,820,998 B2* | 11/2004 | Chen | ............ | F21K 9/135 |
| | | | | 362/249.05 |
| 6,975,220 B1* | 12/2005 | Foodman | ............ | G06F 17/3089 |
| | | | | 340/506 |
| 7,327,254 B2* | 2/2008 | Chen | ............ | F21K 9/13 |
| | | | | 340/321 |
| 8,066,392 B2* | 11/2011 | Wang | ............ | F21S 9/022 |
| | | | | 362/20 |
| 8,456,568 B2* | 6/2013 | Wendt | ............ | F21V 14/02 |
| | | | | 348/370 |
| 8,820,961 B2* | 9/2014 | Kim | ............ | F21S 8/086 |
| | | | | 348/143 |
| 2004/0201989 A1* | 10/2004 | Raskas | ............ | H04N 5/2256 |
| | | | | 362/253 |
| 2005/0087702 A1* | 4/2005 | Ford | ............ | F21L 4/02 |
| | | | | 250/504 R |
| 2005/0269480 A1* | 12/2005 | Ford | ............ | F21L 4/02 |
| | | | | 250/200 |
| 2008/0177646 A1* | 7/2008 | Frink | ............ | G06Q 10/1091 |
| | | | | 705/32 |
| 2009/0310342 A1* | 12/2009 | Chang | ............ | F21L 4/027 |
| | | | | 362/205 |
| 2010/0148672 A1* | 6/2010 | Hopper | ............ | F21V 23/0435 |
| | | | | 315/113 |

* cited by examiner

MULTIFUNCTIONAL HOME MONITORING SYSTEM COMBINED WITH LIGHTING DEVICE

CROSS-REFERENCE TO RELATED APPLICATION

This is a continuation-in-part of co-pending U.S. patent application Ser. No. 14/258,029 filed on Apr. 22, 2014 and owned by the present applicant.

TECHNICAL FIELD OF THE INVENTION

The present invention relates generally to a multifunctional home monitoring system combined with a lighting device, in which a plurality of detection assemblies having various functions is arranged inside the lighting device for detecting human bodies and environment conditions so that corresponding functions may be activated according to settings of standard reminder light and sound.

DESCRIPTION OF THE PRIOR ART

With the light-emitting diode (LED) technology getting mature in various applications, in addition to the development of techniques regarding energy saving and lighting, manufacturers also focus on the development of styles and functions of LED related devices available in the market to provide multiple functions associated therewith. However, most of the LED products or devices available in the market are designed and manufactured for applications in homes and small-sized companies. Functions that are integrated in such LED products are generally simple ones. In addition to the bulkiness in size as compared to the ordinary LED products, extra accessory or assemblies need to be additionally included for proper operation and use. Further, subsequent maintenance and replacement of parts are also difficult for general consumers.

In addition, modern societies of all the countries around the world are becoming elderly societies of aged people. Home care and attendance are increasingly important. Hiring professional caretakers for home care is a substantial economic burden and the review process of qualification for home care is long and complicated. This is a great burden, both economically and mentally, for regular families living on monthly salaries or middle class families. Although cloud based monitoring devices are available in the market, a major disadvantage is that in case of any emergency, people can only get aware of such emergent situations from the monitoring screen and no immediate action can be taken to handle such emergent situations. Apparently, further improvement is necessary.

SUMMARY OF THE INVENTION

The present inventor has engaged in business regarding development and manufacture of LED products and becomes aware that a combination of LED detection devices and remote monitoring devices, such as those discussed above, to form a stand-alone system would generally suit the needs for families that need home care and attendance and help build a residential monitoring environment based on intelligent control.

An example is proposed in U.S. Patent Publication No. 2008/0177646 A1, which discloses a work site remote monitoring and employee time tracking system, wherein personnel information under surveillance, together with on-site biometric scanning data, is transferred through network to a user end in order to determine the movement ranges and behavior of the employees for the purpose of employee management. Such a system needs an additional device to determine if an employee has come into a surveillance range and would be difficult for applications of household environment monitoring.

Japanese Patent Applicant No. 2012-22579 discloses a standing wave radar involving an built-in LED lighting device that is operable to detect the distance and biological or physiological conditions of a human body based on which lighting and alarm may be activated and that may be installed in a building, a transportation vehicle, and even a road to cope with different applications. However, a major drawback is that efficient detection abnormality of a human body with high detection precision is generally not available for such a device and the range of detection of such a device is generally short, making it difficult for applications in a household or interfering environment.

The present invention is made such that a lighting device is combined with various detection and remote monitoring techniques to provides a multifunctional home monitoring system combined with lighting device, which is structured to provide improvement to a detection function of low accuracy of an existing structure and to integrate electrical appliances that are commonly used in the home environment and to connect with human body condition identification devices through the system so that the multifunctional home monitoring system combined with lighting device of the present invention exhibits practice value of use and comprises: a main housing, which has an interior space in which a main control board is arranged. The main control board is electrically connected to a detection module, a control module, a status indicator assembly, an LED light assembly, a speaker, and a microphone that are also arranged in the main housing. The detection module is primarily operable to detect a target object and conditions of environment and feeding monitoring data back to the main control board for transmitting messages to a wireless device (such as a tablet computer, a smart phone, a handheld or wearable device, an in-vehicle infotainment system (IVI) to be displayed by the status indicator assembly. The LED light assembly has various color temperatures for illumination. A lower housing is mounted to a lower side of the main housing. The lower housing comprises a secondary illumination light arranged therein, and an image capture module arranged in the illumination light. The image capture module also provides a function of image recognition. The secondary illumination light is operable in combination with the LED light assembly to provide various modes of illumination. The lower housing is provided therein with a status indicator assembly. The main housing is provided in the interior space thereof with a motor and a detection so that the illumination light and the image capture module can be rotated for tracking thereby expanding the range of recording of images of the home environment and a target object under monitoring.

With the main control board operable in combination with detection modules of different functions, a target and the environment within a detection range can be fully monitored, and through connection with various household electric appliances, in combination with predetermined setting values, integration with the home environment can be achieved easily and easy identification can be achieved for normal operation thereby helping improve living quality and security.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
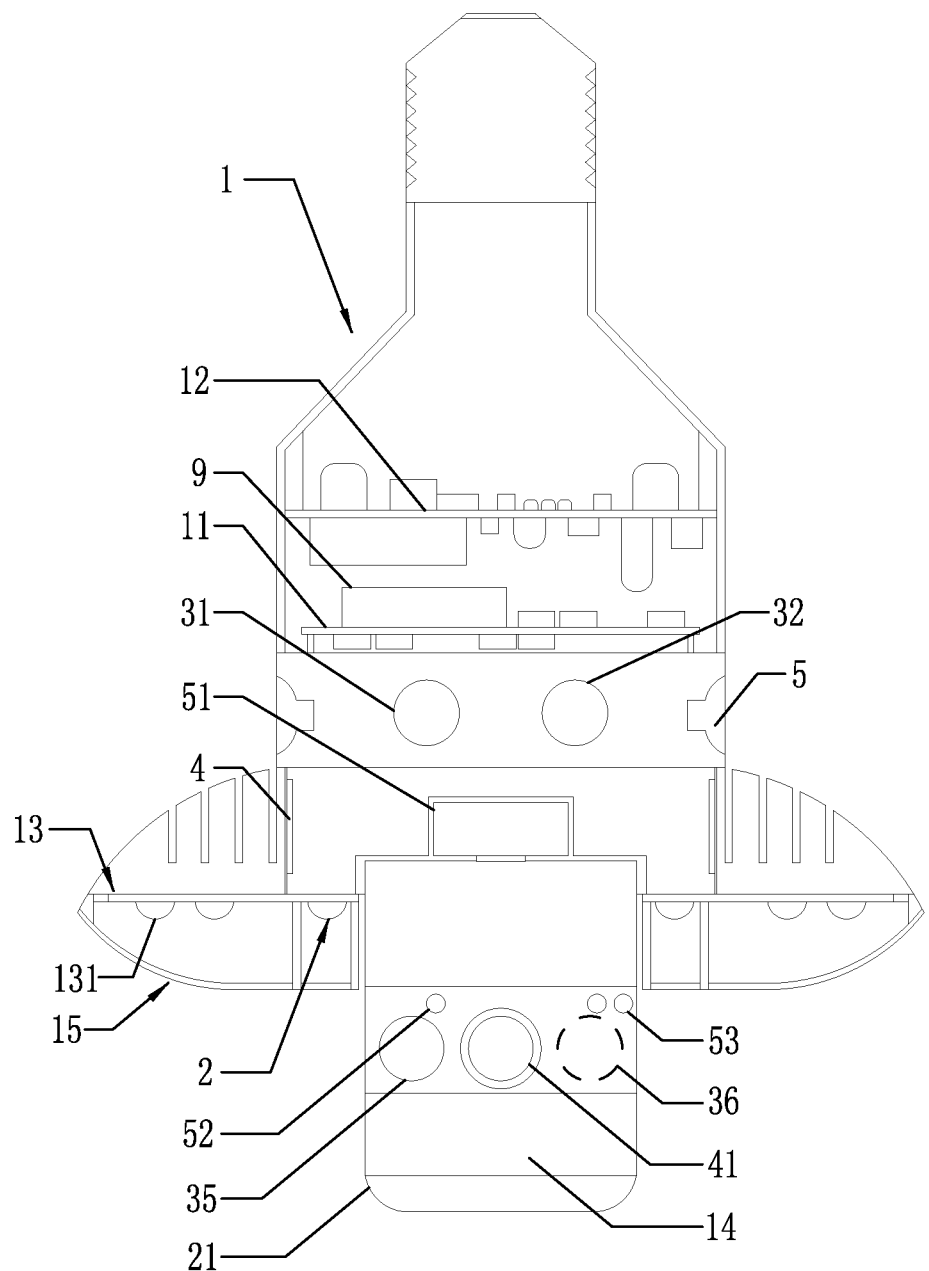
FIG. 1 is a schematic view illustrating interior structure of the present invention.
Figure 2:
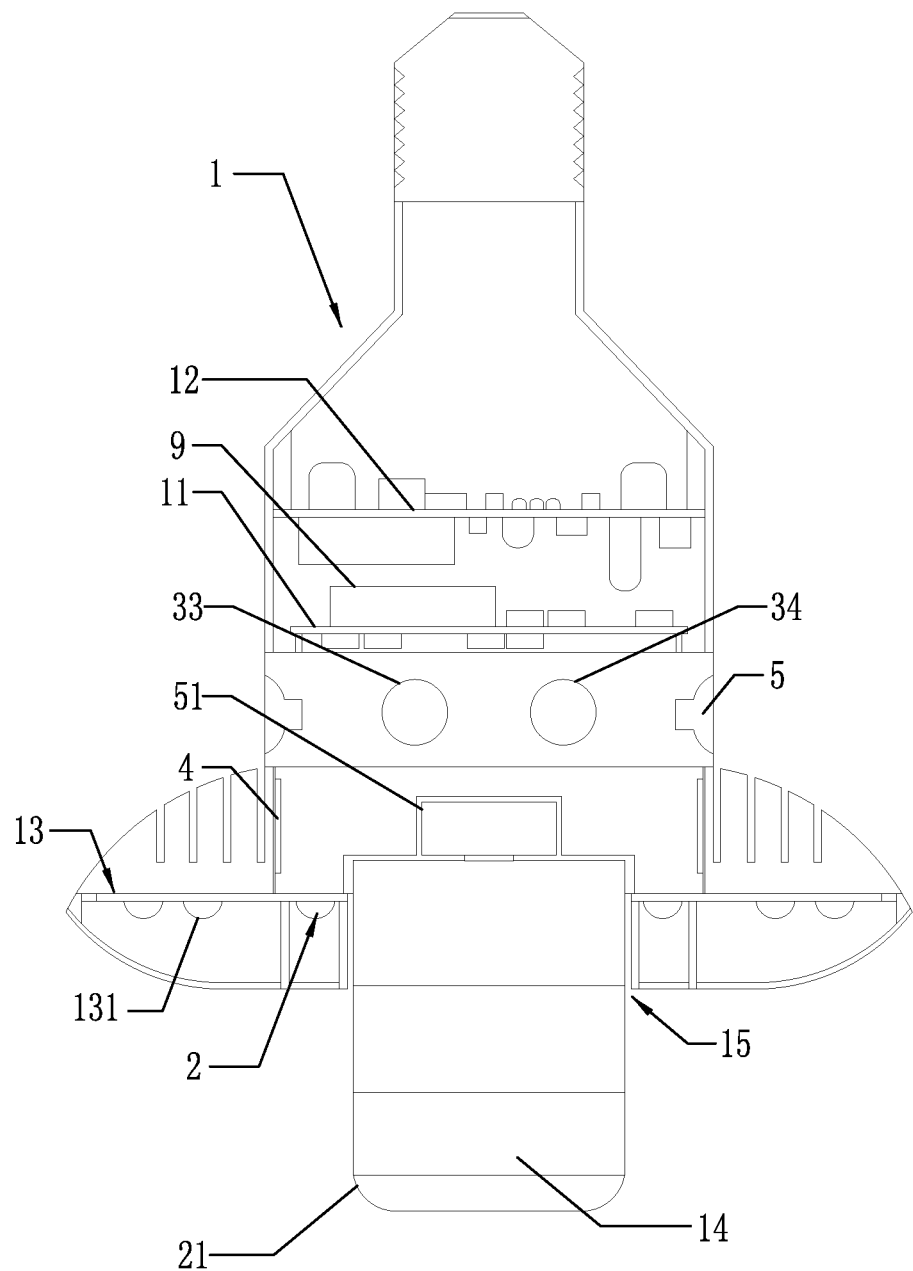
FIG. 2 is another schematic view illustrating the interior structure of the present invention.
Figure 3:
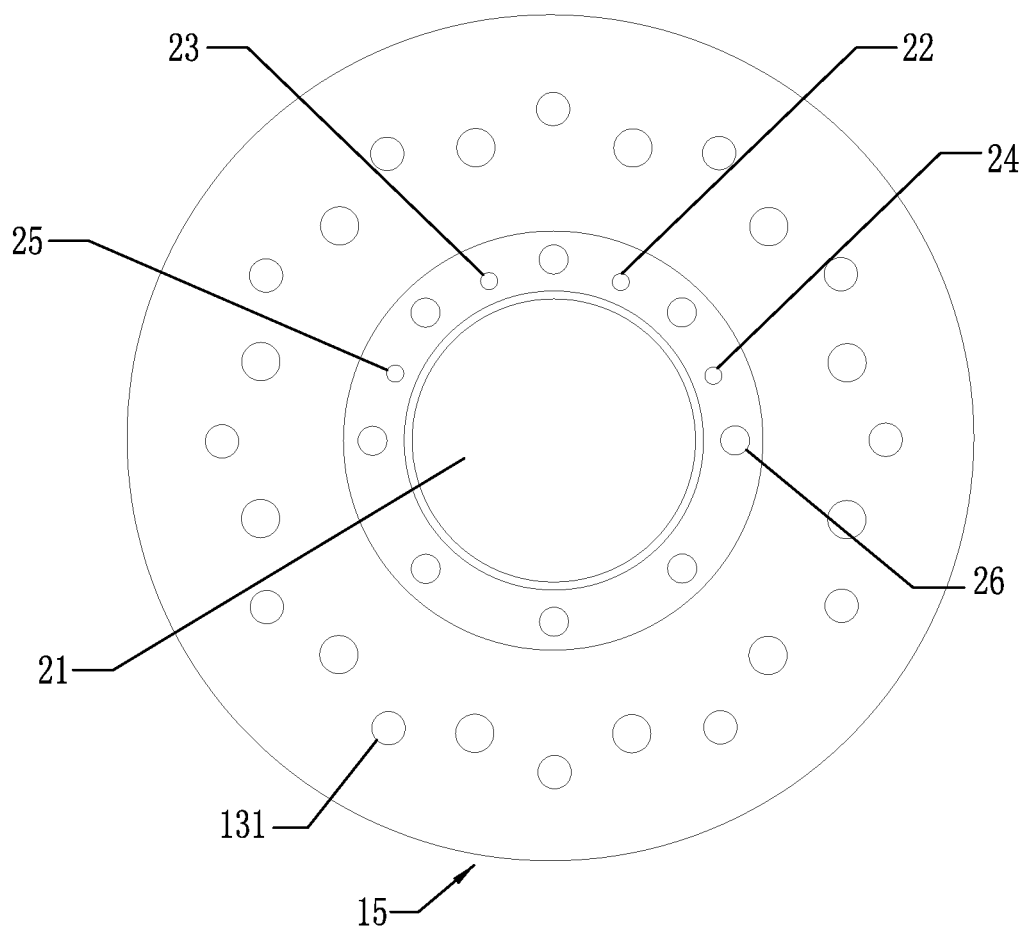
FIG. 3 is a schematic view illustrating a status indicator assembly of a lower housing of the present invention.
Figure 4:
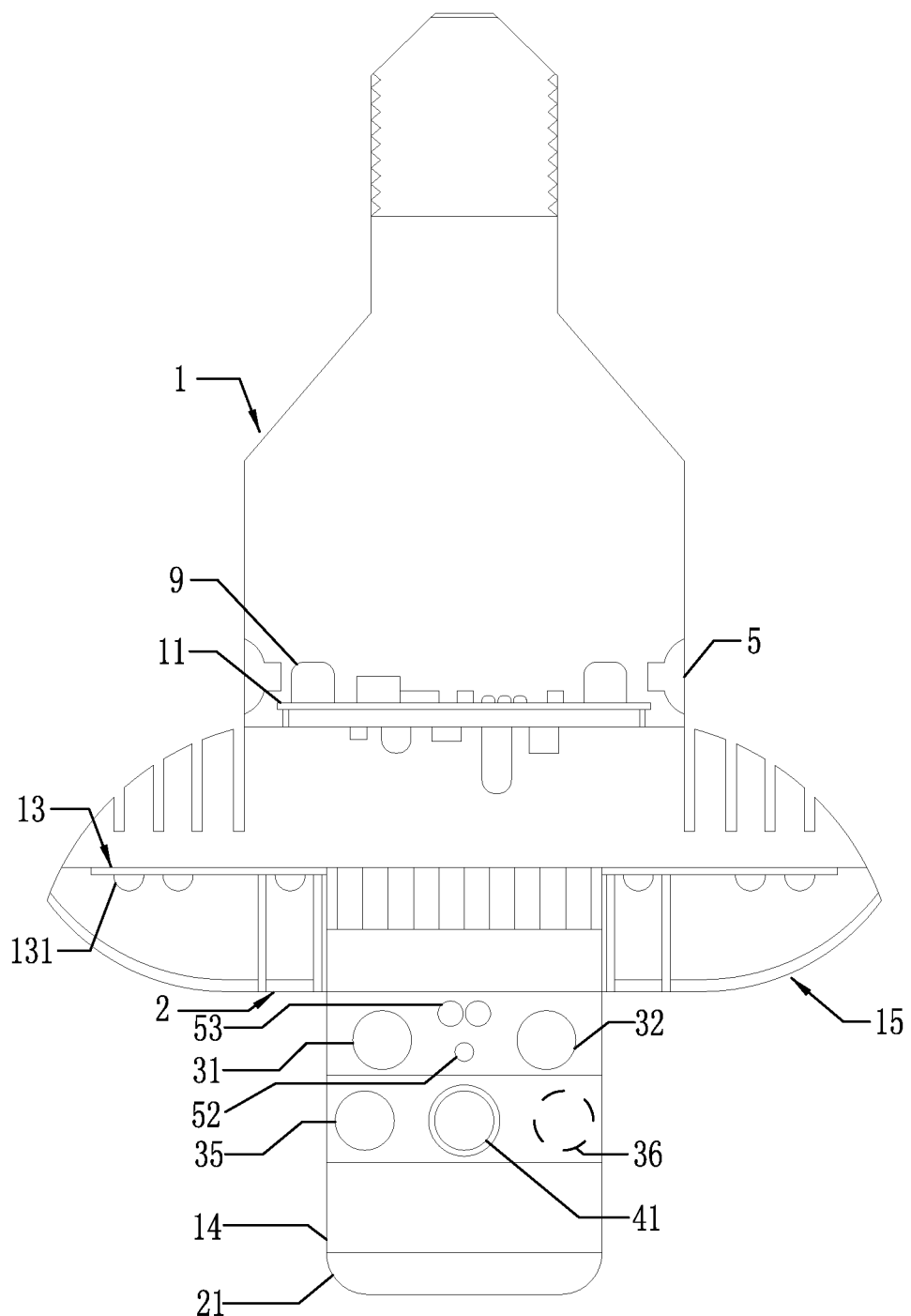
FIG. 4 is a schematic view illustrating interior structure of a second embodiment of the present invention.
Figure 5:
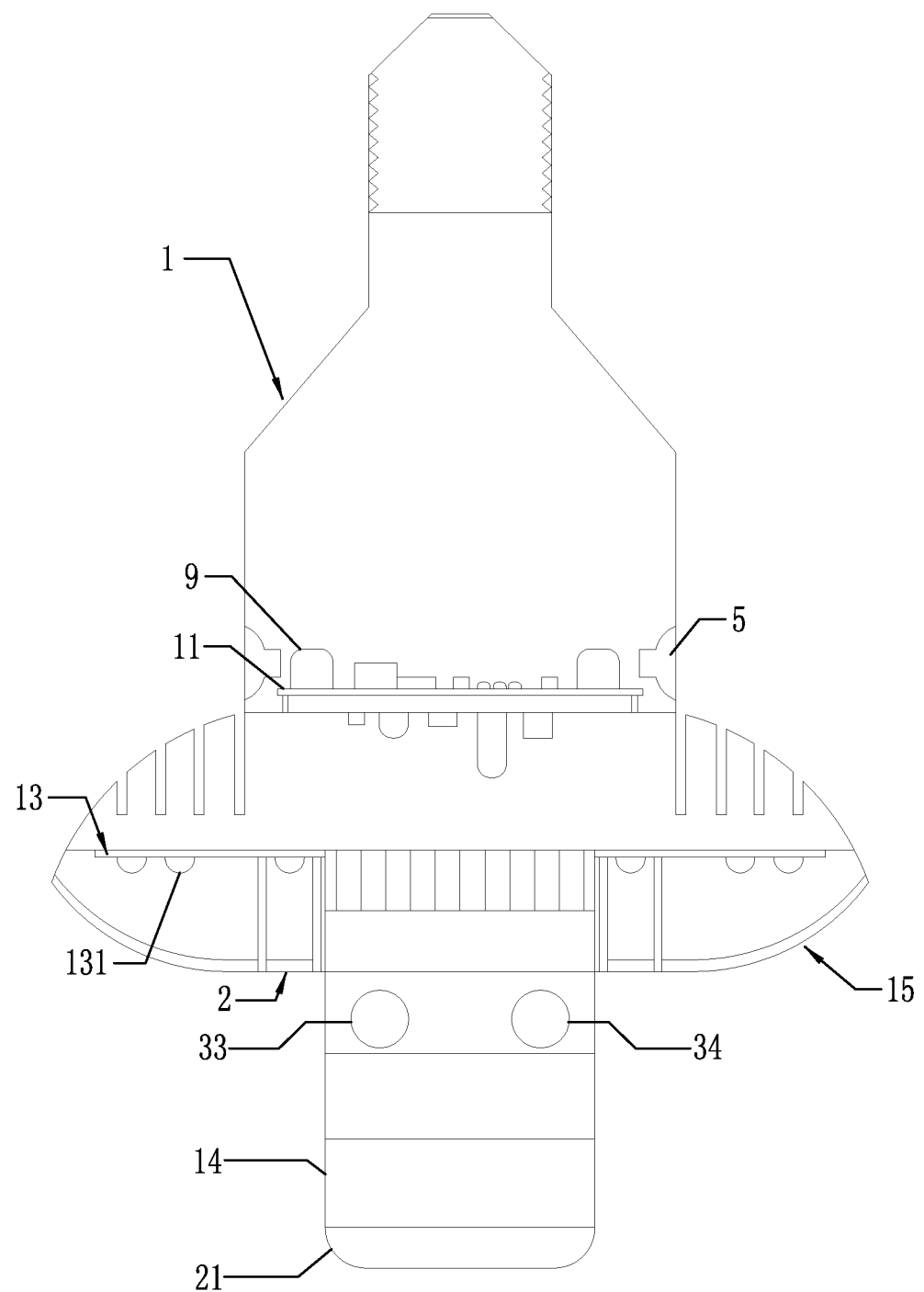
FIG. 5 is another schematic view illustrating the interior structure of the second embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Generally according to the present invention, the preferred feasible embodiments will be described hereinafter with respect to the attached drawings in order to help better understand the present invention. The present invention relates to a multifunctional home monitoring system combined with a lighting device, which as shown in FIGS. 1-5, comprises: a main housing (1) having an interior space in which a main control board (11) and a power board (12) for supplying or converting electrical power are arranged. The main control board (11) and the power board (12) may each be a single-board arrangement or a multiple-board arrangement and the present invention is not limited thereto. The main control board (11) comprises a central processor that processes feedback data and related components that provide connection with and performance of associated functions. Here, the related components include, but not limited to, components/devices for performing infrared, voice, and wireless control. The main control board (11) is also electrically connected to a detection module (3), a control module (9), a status indicator assembly (2), a light-emitting diode (LED) light assembly (131), a speaker (5), and a microphone (52), and the electrically-connected components thereof are all arranged in the main housing (1) and rely on the power board (12) to supply electrical power for operation thereof. Among these components, the microphone and the speaker are generally provided for receiving, recognizing, voice control, and voice broadcasting. The detection module (3) is provided for detecting a target object (6) and environment conditions and feeds back related monitoring data to the main control board (11) to be displayed on the corresponding lights of the status indicator assembly (2). The LED light assembly (131) comprises different color temperatures for illumination purposes. The unit used for color temperature is Kelvin Scale (° K) and is warm white color (2500-3500° K) and cold color (4000-10000° K), of which automatic adjustment can be conducted by the main control board (11) according to determination made on the basis of environmental condition, or manual operation for adjustment is also possible. The LED light assembly (131) is generally arranged on a surface of a light board (13) for being used together and is electrically connected by the light board (13) to the main control board (11). The LED light assembly (131) may switch among various types of illuminations according to the environmental condition, or may adopt a specific type of operation that is built therein and corresponds the preference of a user. The light board (13) can be of a single board arrangement or a multiple board arranged, but not limited thereto. The control module (9) is generally operable for infrared control, voice control, or wireless transmission control and is arranged for establishing connection with a household electrical appliance. The main housing (1) is provided with a lower housing (15) attached to a lower side thereof. The lower housing (15) is provided therein with a secondary illumination light (14) and an image capture module (41) mounted in the secondary illumination light (14). The secondary illumination light (14) is operable in combination with the LED light assembly (131) to provide various illumination modes. In addition, the status indicator assembly (2) is arranged inside the lower housing (15) to clearly display of detection result all sorts of environmental condition and issues alarms. The main housing (1) is provided therein with a motor (51), and the motor (51) is generally coupled to a body detection module (35), a biological recognition module (36), and the secondary illumination light (14), so that the motor (51) may drive the image capture module (41) to rotate for tracking, allowing for expansion of image recording range of the household environment or the target object (6) that is under monitoring.

The detection module (3) comprises: a temperature/humidity detection module (31), an air detection module (32), a gas detection module (33), a smoke detection module (34), a body detection module (35), and a biological recognition module (36), and the detection modules may be increased or decreased according to actual requirement for production and are not limited to the above. The detection module (3) is operable in combination with the status indicator assembly (2) to provide reminders and the status indicator assembly (2) may comprise: an air quality indicator (21), a smoke indicator (22), a gas indicator (23), an IP setting indicator (24), a temperature/humidity indicator (25), and a smoke/gas alarm light (26), and the number of the indicators can be increased or decreased according to actual requirements and is not limited to any specific number, provided clear indication can be achieved.

In the above modules, the gas detection module (33) that is generally for detecting hazardous gas in the surrounding environment and the smoke detection module (34) that is for detecting smokes in the surrounding environment correspond to the smoke/gas alarm light (26), so that when the detection result exceeds a threshold level, corresponding data will be transmitted to a wireless device and flashing alarm and broadcasting alarm are started until to the most dangerous level, where corresponding data and image of detection will be transmitted to a fire department. In normal operations, the smoke indicator (22) and the gas indicator (23) are lit to ensure the detection functions are normally operating. When power failure or insufficient supply of electrical power occurs, these two detection modules are kept in activated condition in priority in order to prevent severe catastrophe of fire or explosion for keeping a secured household environment.

The air detection module (32) is generally for tracking the contents of air quality of the surrounding environment and may conduct detection of suspending particles in air and transmit corresponding data to the wireless device and the air quality indicator (21) corresponding thereto is generally lit for an extended period to give off light of various colors to indicate air quality, including blue for normal quality, yellow for acceptable quality, and red for poor quality; however, the indication can be changed according to actual needs and is not limited to the colors mentioned herein.

The temperature/humidity detection module (31) is generally for detecting temperature and humidity of the surrounding air and the detection data are fed back to the main control board (11), to allow the main control board (11) to transmit the data to the wireless device and the temperature/humidity indicator (25) corresponding thereto is lit during a process of operation thereof to ensure in order to ensure the normal operation of the detection function.

The body detection module (35) is generally for detecting the temperature or motion of a target object (6). The target object (6) can be a person or a pet existing in the surrounding environment. The biological recognition module (36) is for detecting the location and body performance of the target object (6) and is generally embodied with a Doppler radar, wherein data are acquired through frequency of amplitude. The biological recognition module (36) is generally not affected by the material making the main housing (1) or the lower housing (15) and is arranged in a concealed condition to allow for aesthetic outside appearance of the overall structural arrangement. In more details, the operation is based on a moving signal of a high frequency band of a breath signal so that when a breath signal is identified and, based on a moving signal, it is identified according to a resident moving within a fixed period of time that the resident is in an abnormal condition. Thus, based on standing wave analysis, detection range can be expanded and high accuracy of detecting abnormality can be achieved. The IP setting indicator (24) is generally provided for the image capture module (41) to set instructions. The remote control module (9) is provided generally for infrared control, voice control, and wireless transmission control and is connected, via the central process of the main control board (11), to the detection module (3) to achieve automatic control of general household electric appliances, including air cooling/heating devices, air purification devices, dehumidification devices, televisions, and lights, to allow lights to be automatically turned on when a user enters a living room and to allow the associated electrical appliance to be activated according to the setting made by a user and to have the lights and the associated electrical appliance automatically shut down when the user leaves. The wireless module (4) is generally constructed with WIFI, Bluetooth, or other communication techniques and is arranged inside the main housing (1). The wireless module (4) may conduct detection via door/window sensors connected thereto. For example, the sensors mounted to doors and windows can be connected through the wireless module (4) for identifying intrusion through the doors and windows. In case of invasion, the main control board (11) gives an instruction to make the LED light assembly (131) flashing and the speaker (5) activated for broadcast and image capturing and notification and other operations are also initiated to help ensure home security.

The above-described structural arrangement is made such that flashing reminders and sound broadcasting conducted with the detection module (3) and the status indicator assembly (2), in combination with processing of feedback data carried out by the central processor (4) of the main control board (11) make is possible to effectively maintain a secured and comfortable living environment in the house. Further, the motor (51) arranged in the main housing (1) is operable to drive the image capture module (41) to rotate by an angle of 0-360 degrees in order to provide a wider range of monitoring, so that a user name list may be entered in advance before an event occurs to achieve prevention and in case of no response to reminders and data continuously increasing to reach an extremely dangerous level, information may be transmitted through a network to a fire department, where the information transmitted includes currently detected on-site gas concentration, address, images, or other data, sufficient for the fire fighters to fully realize the on-site conditions.

In a second embodiment of the present invention, the status indicator assembly (2), the detection module (3), and the image capture module (41) are arranged in the lower housing (1) to allow the detection module (3) and the image capture module (41) to drive the motor (51) to track the target object (6), with a detection range also being expanded to cover 360 degrees so as to be wider than that of the previous structural arrangement. As shown in FIGS. 1-5, the secondary illumination light (14) includes therein a light detector so that when it becomes dark, the secondary illumination light (14) is activated for dimming light illumination for burglary invasion protection. When the user is back to the resident, the LED light assembly (131) is automatically turned on to provide normal illumination lighting and under this condition, the secondary illumination light (14) is automatically shut down.

Figure 6:
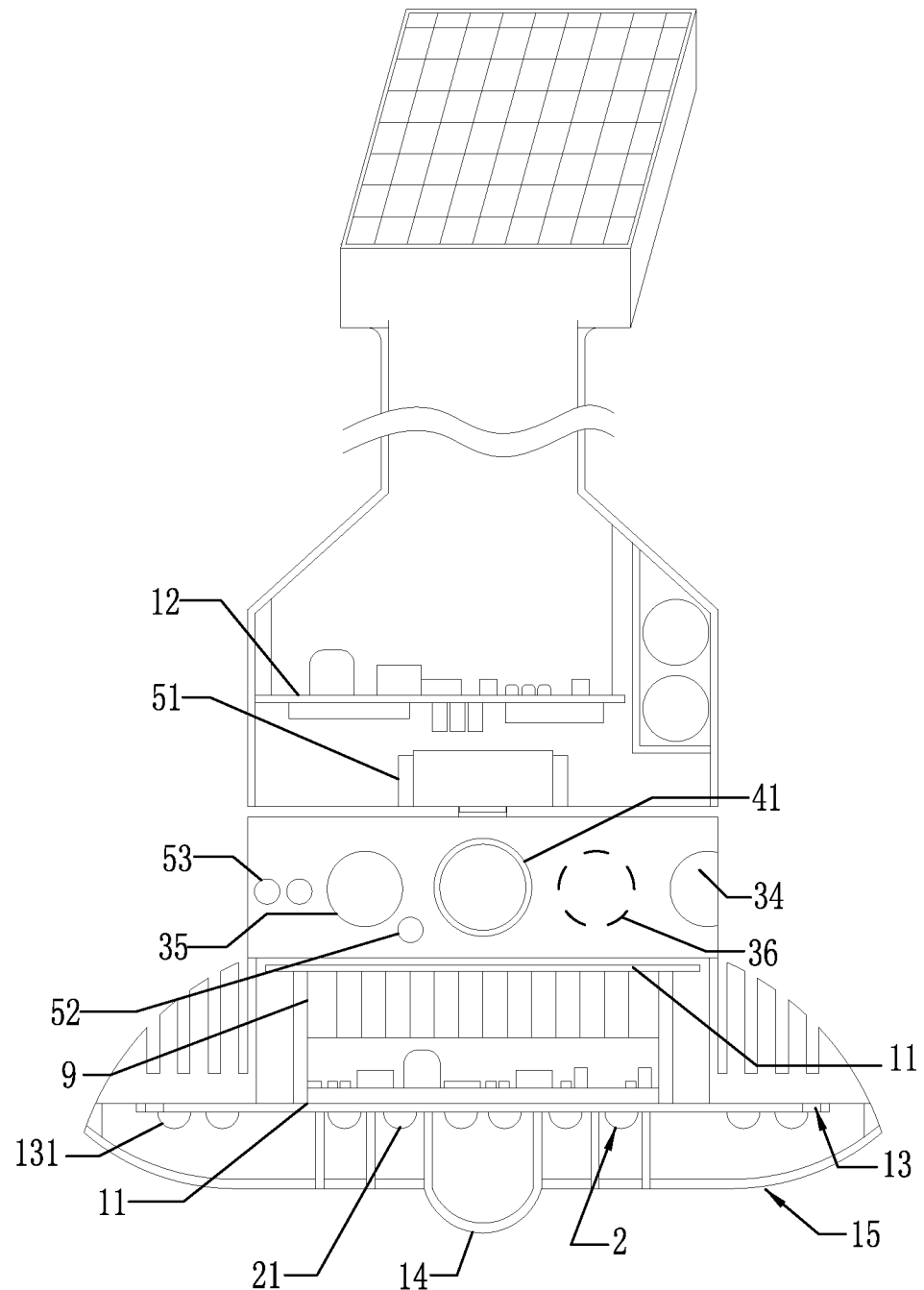
FIG. 6 is a schematic view illustrating interior structure of a third embodiment of the present invention.
Figure 7:
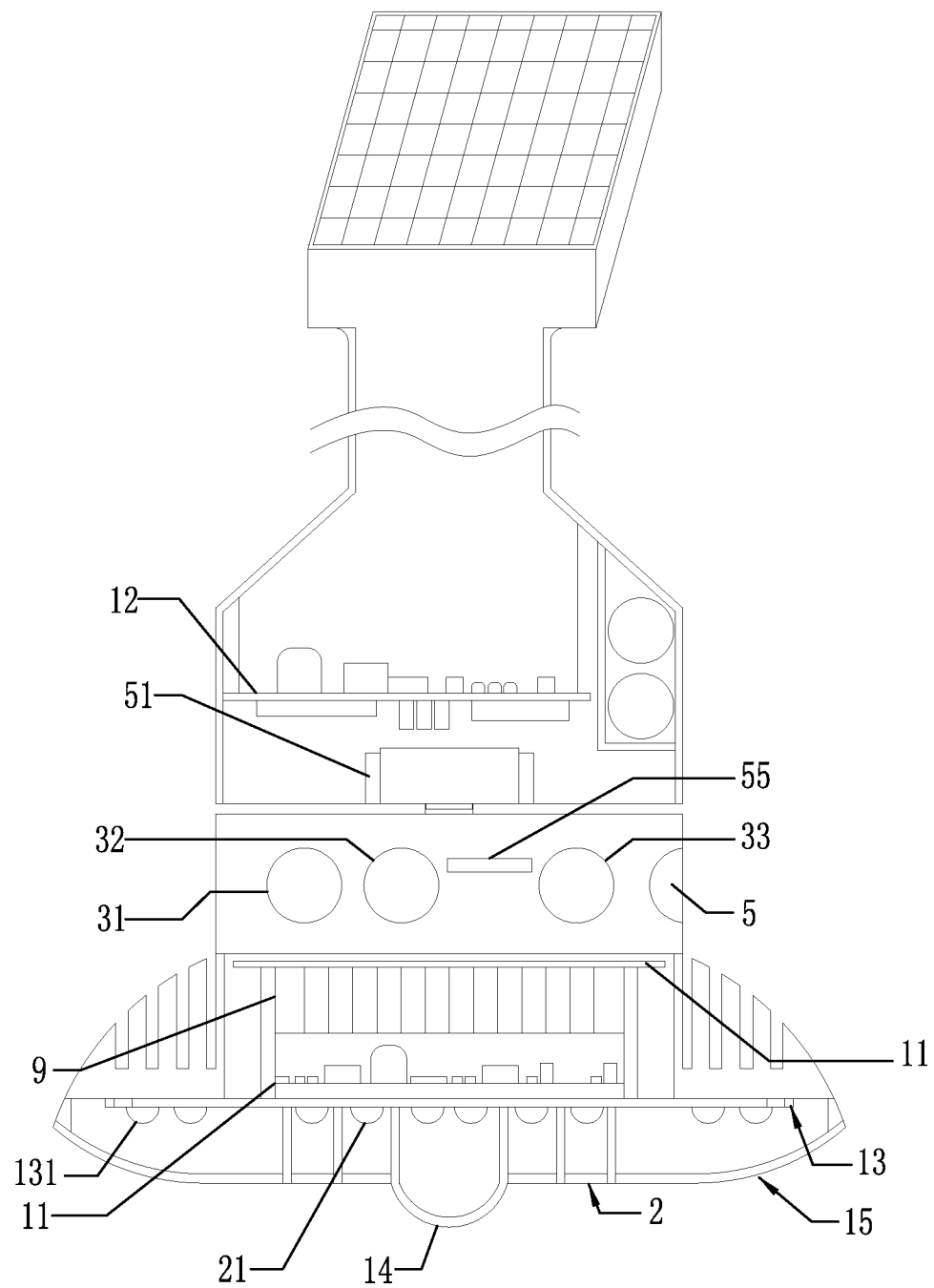
FIG. 7 is another schematic view illustrating the interior structure of the third embodiment of the present invention.
Figure 8:
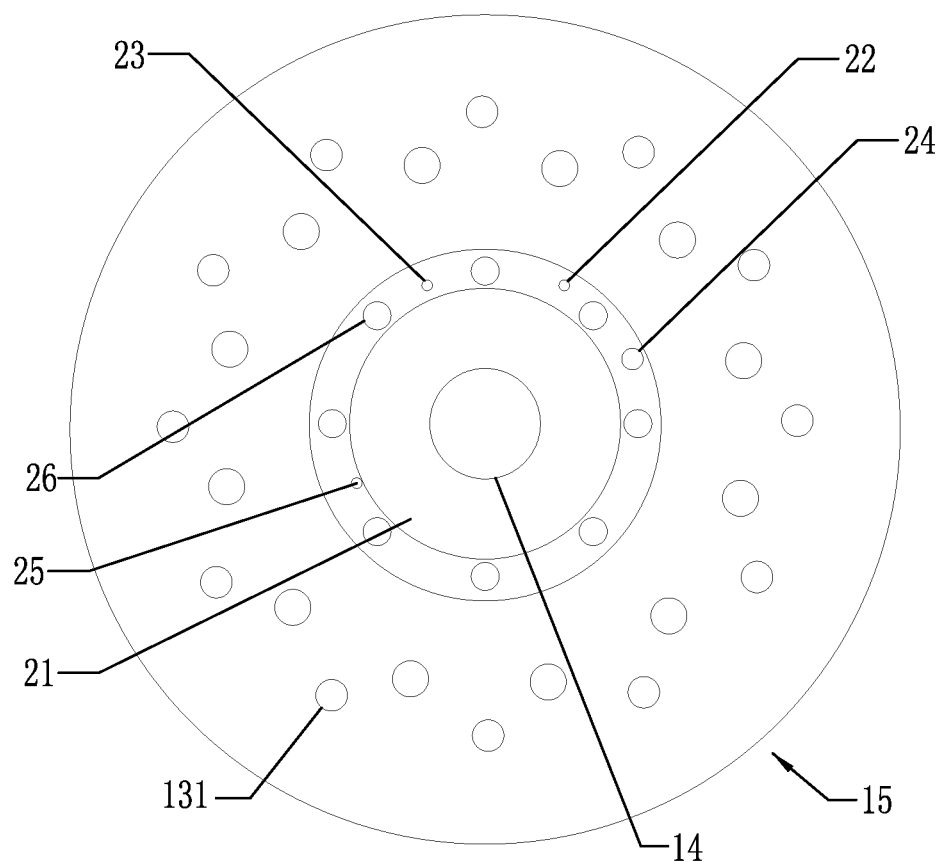
FIG. 8 is a schematic view illustrating indicator assembly of the third embodiment of the present invention.
Figure 9:
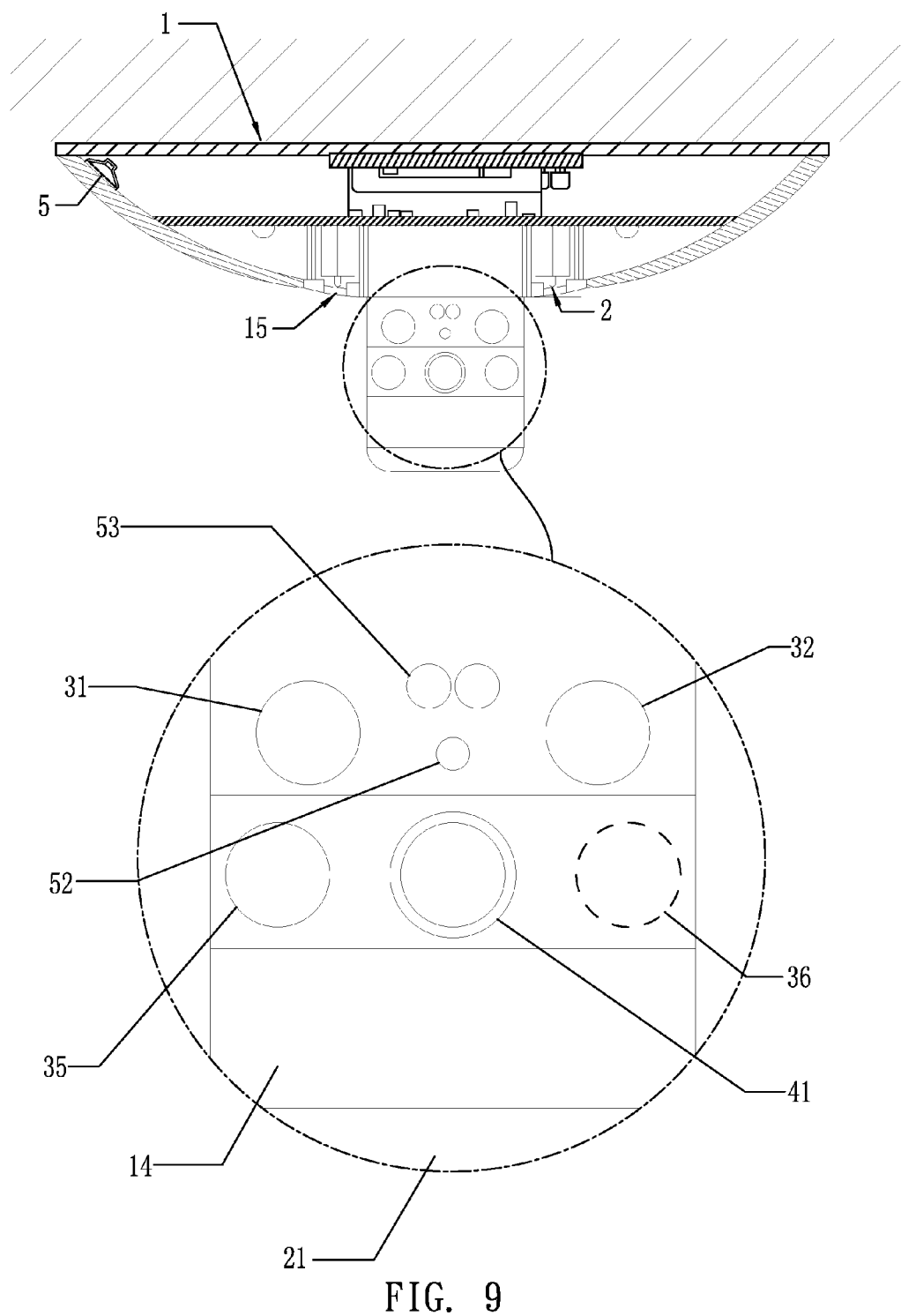
FIG. 9 is a schematic view illustrating interior structure of a fourth embodiment of the present invention.
Figure 10:
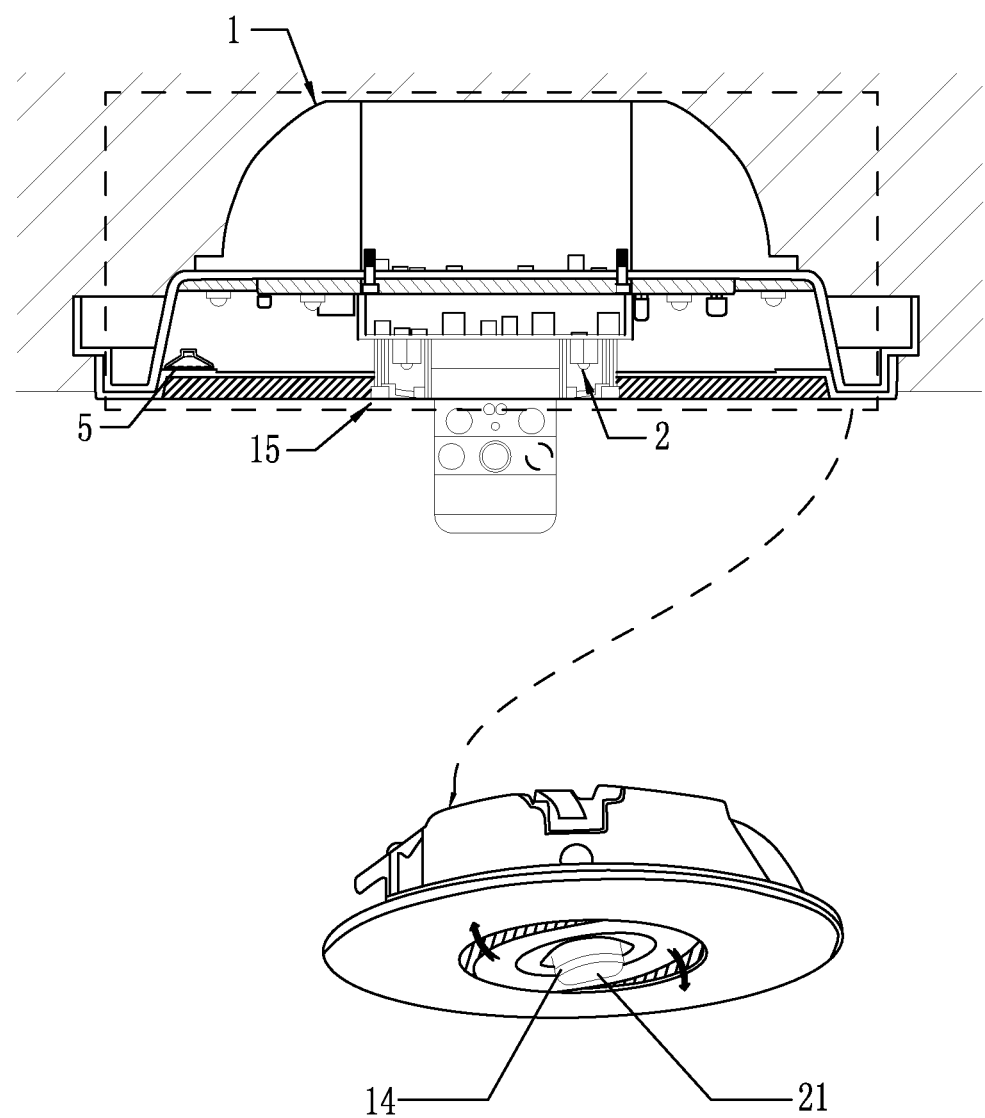
FIG. 10 is a schematic view illustrating interior structure of a fifth embodiment of the present invention.
Figure 11:
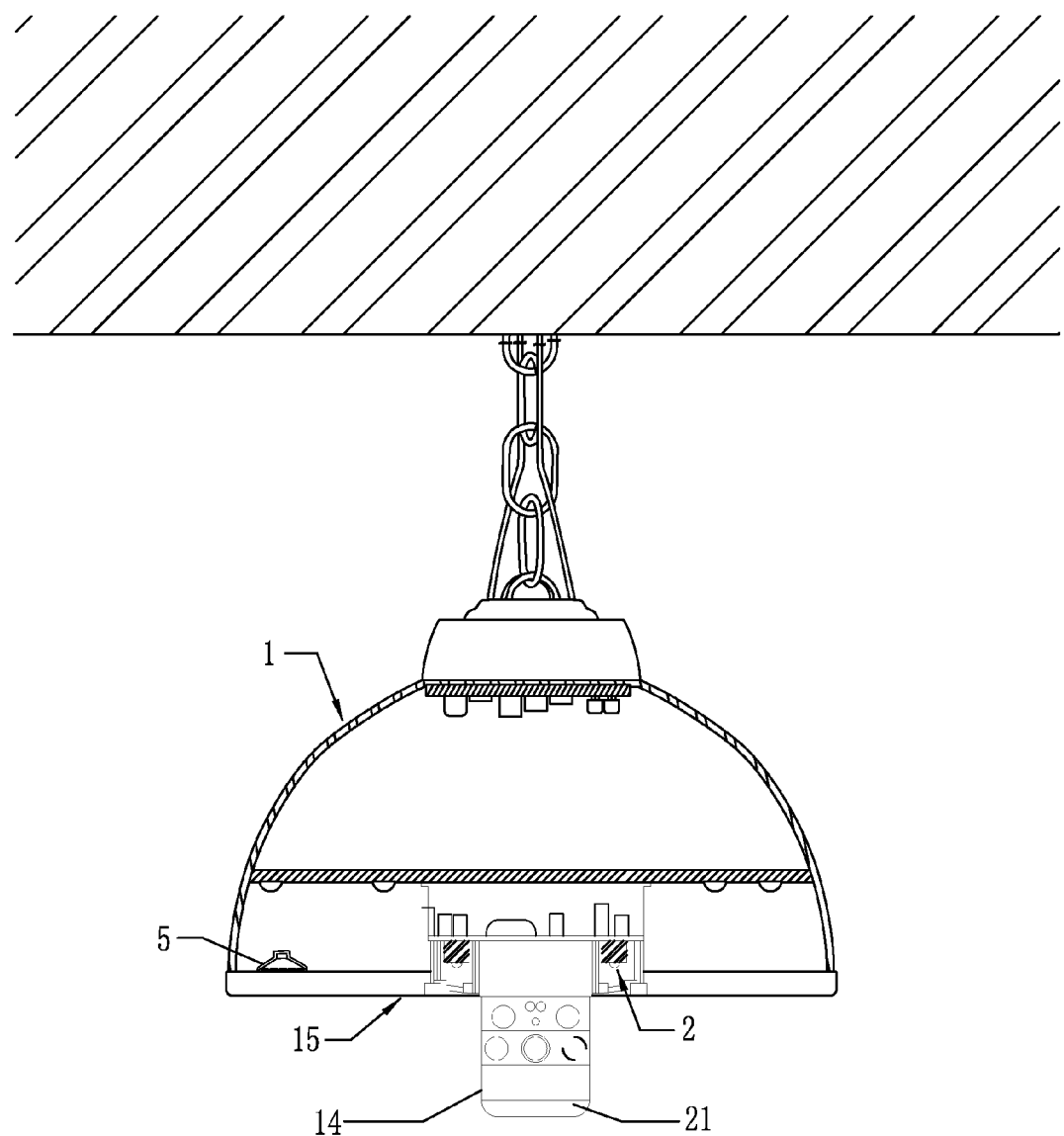
FIG. 11 is a schematic view illustrating interior structure of a sixth embodiment of the present invention.
Figure 12:
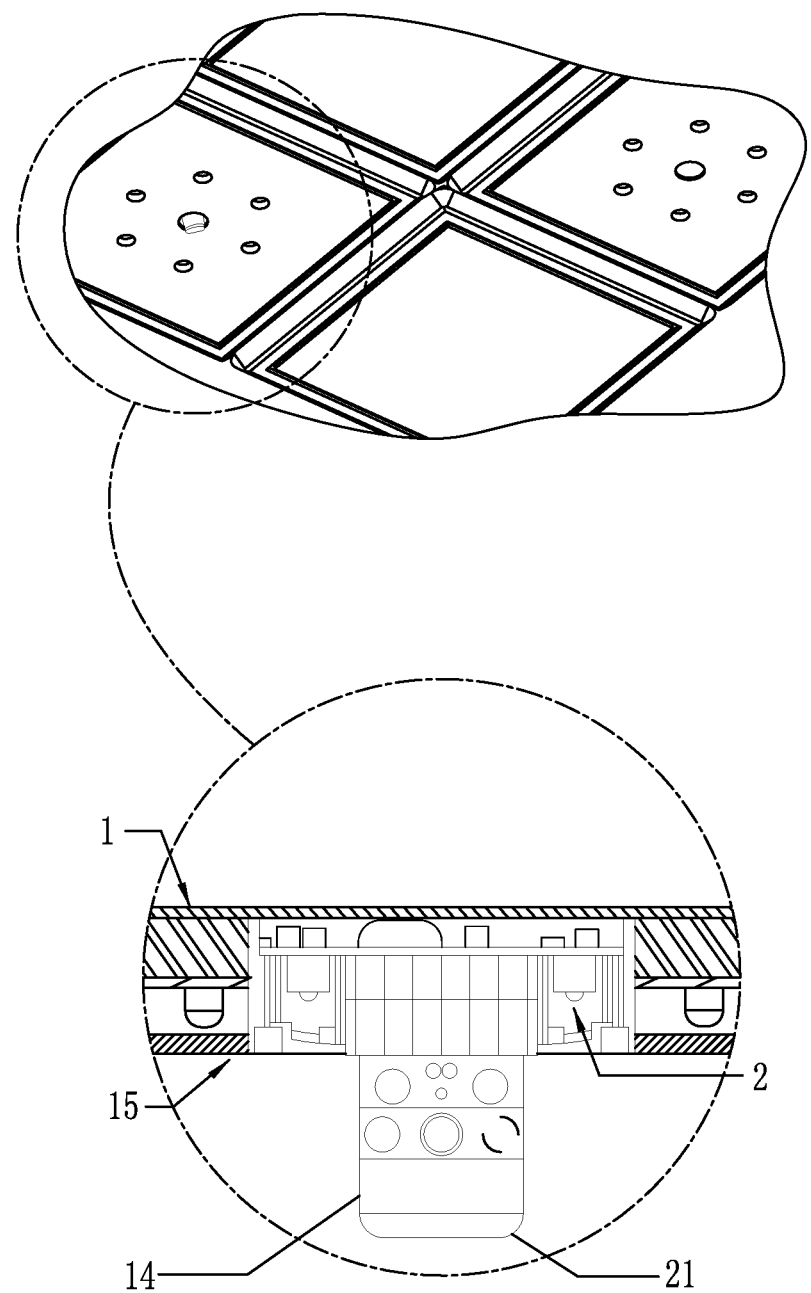
FIG. 12 is a schematic view illustrating interior structure of a seventh embodiment of the present invention.

Referring to FIGS. 6-8, a third embodiment is illustrated. The main housing (1) is provided therein with a main control board (11), and the main control board (11) is electrically connected to a detection module (3), a control module (9), a LED light assembly (131), a speaker (5), and a microphone (52). The detection module (3) detects a target object (6) and environment conditions and feeds monitoring data back to the main control board (11) to be displayed through the status indicator assembly (2). The LED light assembly (131) has various color temperatures to switch illumination lighting according to the surrounding condition. A motor (51) is arranged inside the main housing (1) and is connected to the detection module (3) of the main control board (11) so that the motor (51) may drive the image capture module (41) to rotate to allow for expansion of image recording range of the surrounding environment or the target object (6). The main housing (1) is provided with a memory card slot (54) to allow for transfer and copying of the recorded image. A lower housing (15) is provided for attaching to the lower side of the main housing (1). The lower housing (1) is provided therein with a status indicator assembly (2) for clearly displaying all sorts of conditions.

The third embodiment is different from the previously described first and second embodiments in that the secondary illumination light (14) and the lower housing (15) that projects outward by a quite distance in the previous embodiments are made not so prominent and re smoothened out for applications in various other lighting fixtures, such as fourth to seventh embodiments illustrated in FIGS. 9-12, which are respectively a ceiling light, an embedded light, a bay light, and a flat fluorescent light, and can also be used in other compatible lighting fixtures, but not limited thereto.

Figure 13:
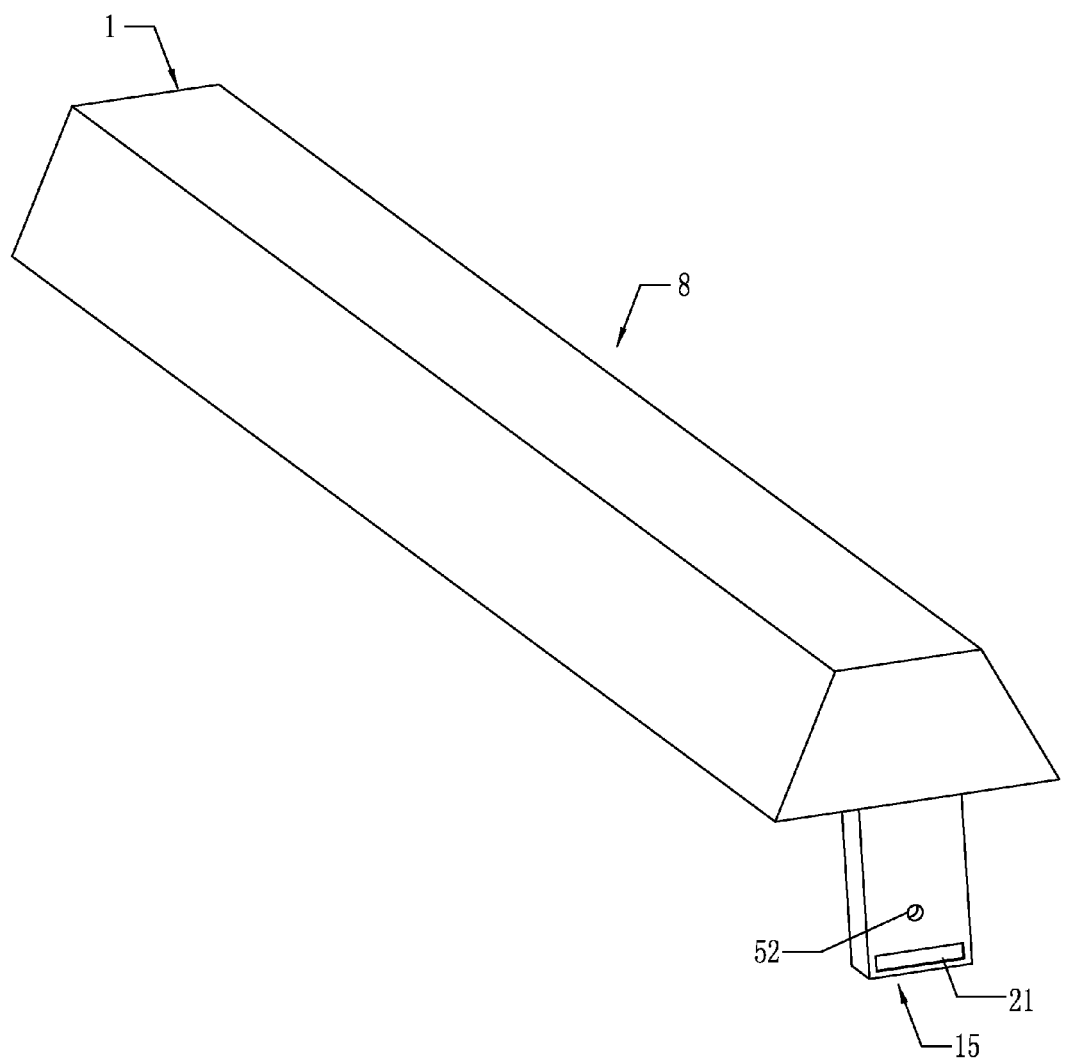
FIG. 13 is a perspective view illustrating an eighth embodiment of the present invention.
Figure 14:
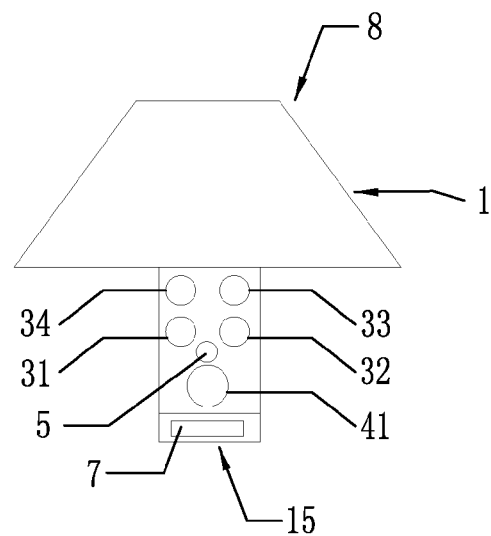
FIG. 14 is a left side elevational view of the eighth embodiment of the present invention.

Referring to FIGS. 13-14, an eighth embodiment of the present invention is illustrated, generally comprising a light body (8), which is properly packaged to form a plant light. The light body (8) is generally composed of a main housing (1) and a lower housing (15) and the main housing (1) comprises, arranged therein, an image capture module (41), a gas detection module (33), a temperature/humidity detection module (31), an air detection module (32), and a smoke detection module (34) for detecting external environment conditions and recording images and being in connection with a speaker (5) and a microphone (52) for the purposes of voice reminders. A temperature/humidity indication gauge is arranged on a surface of the lower housing (15) for data readings and transmission of data to the wireless device to allow a user to effectively manage and regulate the growing environment of plants.

Figure 15:
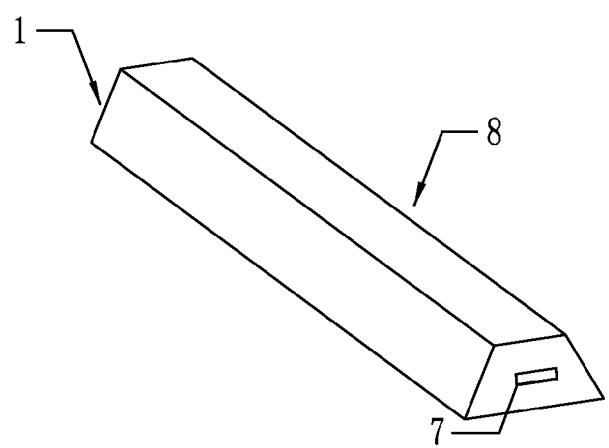
FIG. 15 is a perspective view illustrating a ninth embodiment of the present invention.
Figure 16:
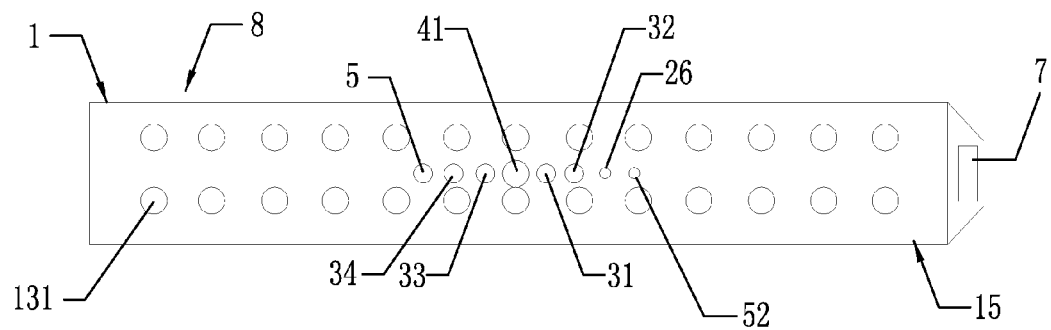
FIG. 16 is a bottom view of the ninth embodiment of the present invention.
Figure 17:
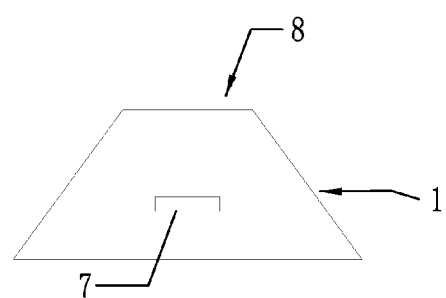
FIG. 17 is a right side elevational view of the ninth embodiment of the present invention.

Referring to FIGS. 15-17, a ninth embodiment of the present invention is illustrated and is different from the eighth embodiment in that the lower housing (15) that is located outside the main housing (1) in the eighth embodiment is retracted inwardly to be located inside the main housing (1) and a temperature/humidity indication gauge (7) is arranged on an outer surface of the main housing (1) to provide the surrounding environment data of plants to a user for regulating and achieving the best environment for plant growing.

In summary, the present invention provides a multifunctional home monitoring system combined with lighting device, in which a detection module (3) of a main control board (11) and a status indicator assembly (2) associated therewith for purposes of reminding are used to make monitoring of home living environment better and also, infrared control or voice control is used to allow household electric appliances to perform a series of automatic collaborative operations. In addition, the combination of the detection module (3) with an image capture module (41) provides a better way of home care of the elderly. The cost of the present invention is much lower than products of similar functions available in the markets and is also much easier to use, making it possible to realize an interactive and practical smart home.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multifunctional home monitoring system, comprising:
   a main housing, which has an interior space in which a main control board is arranged, the main control board being electrically connected to a detection module, a control module, a status indicator assembly, a light-emitting diode (LED) light assembly, a speaker, and a microphone, the detection module being operable to detect a target object and conditions of surrounding environment and generating and feeding monitoring data back to the main control board to be displayed by the status indicator assembly, the LED light assembly having various color temperatures for illumination;
   a lower housing mounted to a lower side of the main housing, the lower housing comprising a secondary illumination light mounted therein, an image capture module being mounted in the secondary illumination light, the secondary illumination light being operable in combination with the LED light assembly to provide multiple illumination modes, the status indicator assembly being arranged in the lower housing to clearly display indications of various conditions; and
   a motor arranged inside the main housing, the detection module being coupled to the motor, so that the motor is operable to drive the image capture module to rotate in order to cover an expanded range for image recording of environment or the target object;
   wherein the status indicator assembly comprises: a smoke indicator, a as indicator, and an IP setting indicator, which are electrically connected to the main control board to emit light for indication.

2. The multifunctional home monitoring system according to claim 1, wherein the detection module further comprises:
   a temperature/humidity detection module that is operable to detect temperature/humidity of the environment;
   an air detection module that is operable to detect contents of suspending particles in the environment outside the main housing; a gas detection module that is operable to detect hazard gas in the environment outside the main housing;
   a smoke detection module that is operable to detect smoke in the environment outside the main housing; a body detection module that is operable to detect temperature and motion of the target object; and
   a biological recognition module that is operable to detect location of the target object, each of these module feeding data back to the main control board for determining setting standards of the target object and the environment and activating/de-activating the corresponding functions.

3. The multifunctional home monitoring system according to claim 2, wherein the detection module is mounted in one of the main housing and the lower housing.

4. The multifunctional home monitoring system according to claim 2, wherein the image capture module is mounted in one of the main housing and the lower housing.

5. The multifunctional home monitoring system according to claim 1, wherein the image capture module is rotatable in a range of 0-360 degrees.

6. A multifunctional home monitoring system, comprising:
- a light body, which comprises a main housing and a lower housing;
- wherein the main housing comprises an image capture module, and a gas detection module, a temperature/humidity detection module, an air detection module, and a smoke detection module arranged therein to detect outside conditions and record images and being further provided with a speaker and a microphone for voice reminders;
- an air quality indicator is mounted on a surface of the lower housing for displaying data; and
- a temperature/humidity indication gauge mounted at one side of the main housing for displaying data.

* * * * *